US012609256B2

(12) United States Patent
Yang

(10) Patent No.: US 12,609,256 B2
(45) Date of Patent: Apr. 21, 2026

(54) DIRECT CURRENT SOLID-STATE AIRGAP WITH PARALLEL MULTI-THROW SWITCH

(71) Applicant: Siemens Industry, Inc., Alpharetta, GA (US)

(72) Inventor: Guang Yang, Johns Creek, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 127 days.

(21) Appl. No.: 18/617,750

(22) Filed: Mar. 27, 2024

(65) Prior Publication Data

US 2025/0309637 A1 Oct. 2, 2025

(51) Int. Cl.
*H01H 33/59* (2006.01)
*H01H 9/54* (2006.01)

(52) U.S. Cl.
CPC .......... *H01H 33/596* (2013.01); *H01H 9/542* (2013.01); *H01H 9/548* (2013.01)

(58) Field of Classification Search
CPC ................. H02H 3/087; H01H 33/596; H01H 2009/543; H01H 2009/544; H01H 2009/546; H01H 9/542; H01H 9/548
See application file for complete search history.

(56) References Cited

U.S. PATENT DOCUMENTS 4,658,320 A * 4/1987 Hongel .................. H01H 9/542 361/13
4,700,256 A * 10/1987 Howell .................. H01H 9/542 361/13
5,536,980 A * 7/1996 Kawate .................. H01H 9/547 361/13
5,652,688 A * 7/1997 Lee ........................ H01H 9/542 361/13
11,798,756 B2 10/2023 Yang
2003/0193770 A1 10/2003 Chung
2020/0058454 A1* 2/2020 Askan .................... H02H 3/025

FOREIGN PATENT DOCUMENTS

| | | | |
|---|---|---|---|
| DE | 102022111392 A1 * | 11/2023 | ............ H01H 9/542 |
| EP | 3041016 A1 | 7/2016 | |
| EP | 3651175 B1 | 4/2021 | |
| WO | 2018072983 A1 | 4/2018 | |

OTHER PUBLICATIONS

Translation of DE 10 2022 111 392 A1. Nov. 9, 2023. (Year: 2023).*
Xu Yuntao et al:; "The Analysis, Design, and Optimization of an Electronic MOVCircuit for the Solid-State CircuitBreaker Applications"; 2023 IEEE Energy Conversion Congress Andexposition (ECCE), IEEE,Oct. 29, 2023 (Oct. 29, 2023); pp. 1767-1773; XP034508339;DOI: 10.1109/ECCE53617.2023.10362174.

* cited by examiner

*Primary Examiner* — Thienvu V Tran
*Assistant Examiner* — Christopher J Clark

(57) ABSTRACT

A direct current (DC) switch circuit includes an isolation switch, and an interruption circuit connected in series with the isolation switch. The interruption circuit includes a parallel connection of a current conducting branch, a bypass power electronics branch, a gate driving branch, and an energy absorbing branch. The current conducting branch includes a multi-throw switch configured to operate in a first position to establish a first electrical connection between the current conducting branch and a load and a second position to establish as second electrical connection that turns off the bypass power electronics branch.

12 Claims, 19 Drawing Sheets

DIRECT CURRENT SOLID-STATE AIRGAP WITH PARALLEL MULTI-THROW SWITCH

BACKGROUND

1. Field

The present disclosure relates generally to direct current (DC) solid-state switch circuits, and more particularly, to a DC switch circuit including a solid-state aided airgap with a parallel multi-throw switch.

2. Description of the Related Art

In today's electricity distribution, alternate current (AC) power is utilized by a vast majority of electrical applications as a form of supply. The increasing power of renewable energy sources and energy storage systems have demanded high voltage direct-current (DC) switching and protection devices. In recent years, 600 volts DC (VDC), 1000 VDC and 1500 VDC have been used in applications like EV charging, battery storage and utility scale solar power generations. At these high voltage level, switching and interruption become increasingly difficult, mainly due to the lack of zero crossing comparing to alternate-current (AC) system. Power electronics based technologies have been proposed for these high voltage DC systems, because the interruption with power electronics is not dependent on zero-crossing.

Voltage systems utilizing power-based electronics have been developed, which utilize solid-state power electronics to open and close the circuit and solid-state aided airgaps. However, as voltage increases, especially at 1500 VDC, the selections of the main power electronics are limited and are usually designed for higher voltage systems, and hence costly and complicated. Also, although the constructions of the solid-state aided airgap are valid, they are still designed to be driven by low voltage control signals. Therefore, the isolation between the high voltage system voltage and the low voltage control signals becomes difficult.

SUMMARY

According to a non-limiting embodiment, the unidirectional direct current (DC) switch circuit includes an isolation switch, and an interruption circuit connected in series with the isolation switch. The interruption circuit includes a parallel connection of a current conducting branch, a bypass power electronics branch, a gate driving branch, and an energy absorbing branch. The current conducting branch includes a multi-throw switch configured to operate in a first position to establish a first electrical connection between the current conducting branch and a load, and a second position to establish as second electrical connection that turns off the bypass power electronics branch.

According to another non-limiting embodiment, a bidirectional direct current (DC) switch circuit comprises a main current path, an isolation switch, a forward current interruption sub-circuit, a reverse current interruption sub-circuit, and a multi-break switch. The main current path includes a voltage source segment and a load segment, and is configured to deliver a load current to a load. The isolation switch is configured to selectively open or close an airgap between a voltage source and the voltage source segment. The forward current interruption sub-circuit includes a forward current input connected in common with the isolation switch and the voltage source segment, and the reverse current interruption sub-circuit includes a reverse current input connected to the load segment. The multi-break switch is configured to operate in a first position that connects together the voltage source segment and the load segment to establish the main current path, and a second position to establish a connection that turns off one or both of the forward current interruption sub-circuit and the reverse current interruption sub-circuit.

According to yet another non-limiting embodiment, a method of interrupting current delivered to a load connected to a direct current (DC) solid-state switch circuit is provided. The method comprises delivering a load current to the load via a main current path that includes a voltage source segment and a load segment, and operating an isolation switch to selectively open or close an airgap between a voltage source and the voltage source segment. The method further comprises operating a multi-break switch in a first position that connects together the voltage source segment and the load segment to establish the main current path, and operating the multi-break switch in a second position that connects together a forward current interruption sub-circuit and a reverse current interruption sub-circuit to establish a current bypass path that interrupts the main current path.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

FIG. 4 illustrates the DC unidirectional switch circuit conducting current through a current bypass path established while the solid-state switching component is turned on;

FIG. 11 illustrates the DC bidirectional switch circuit conducting current in the forward direction through a first current bypass path established while the first solid-state switching component is turned on;

FIG. 16 illustrates the DC bidirectional switch circuit conducting current in the reverse direction through a second current bypass path established while the second solid-state switching component is turned on;

DETAILED DESCRIPTION

Figure 1:
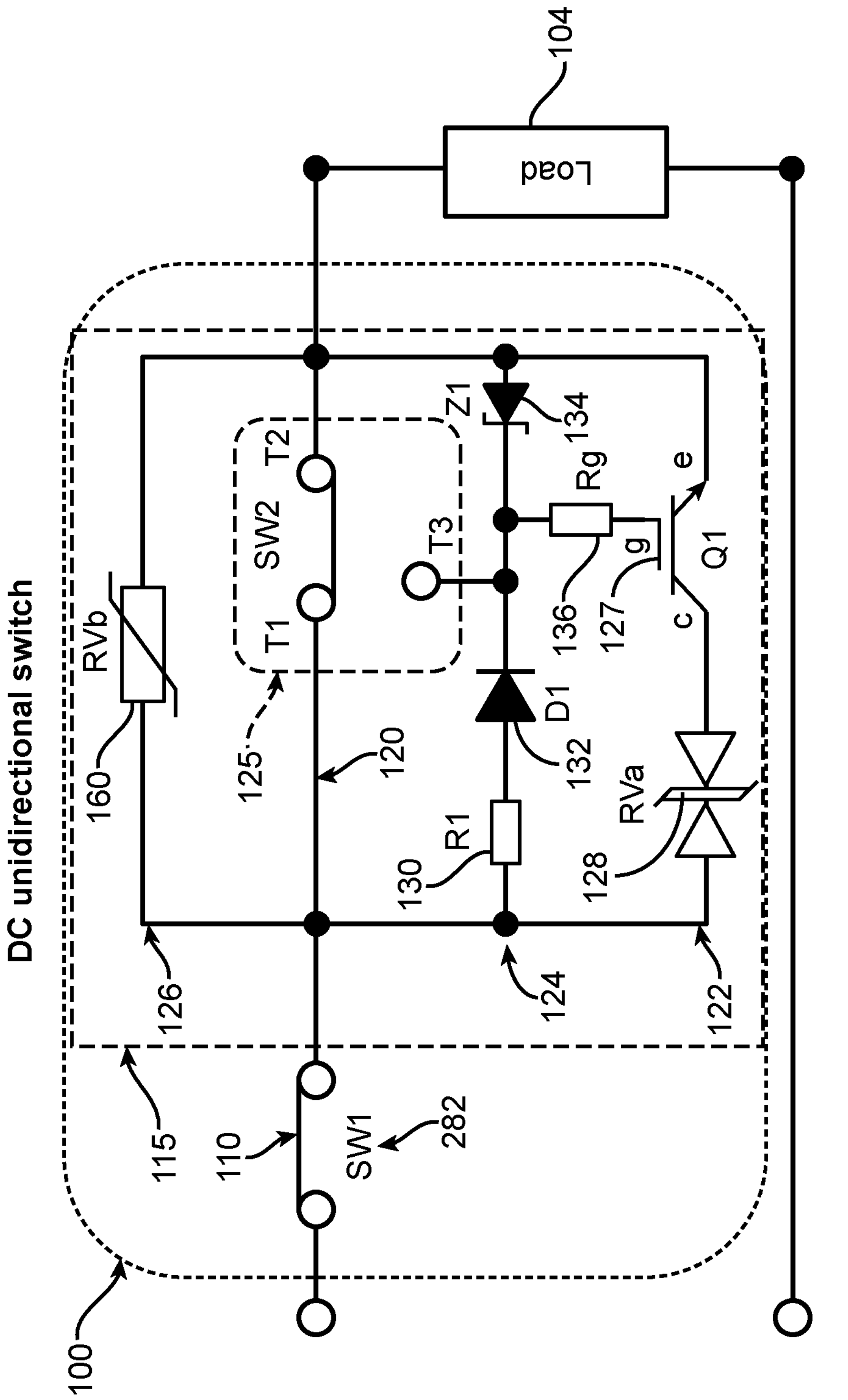
FIG. 1 illustrates a DC unidirectional switch circuit including an interruption circuit that implements solid-state aided airgap with a parallel multi-throw switch according to a non-limiting embodiment of the present disclosure.

Various technologies that pertain to systems and methods that provide a DC switch circuit including a solid-state aided airgap with a parallel multi-throw switch will now be described with reference to the drawings. Like reference numerals represent like elements throughout. the drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

To facilitate an understanding of embodiments, principles, and features of the present disclosure, they are explained hereinafter with reference to implementation in illustrative embodiments. In particular, they are described in the context of a DC switch circuit including a solid-state aided airgap with a parallel multi-throw switch. Embodiments of the present disclosure, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

These and other embodiments of a DC switch circuit including a solid-state aided airgap with a parallel multi-throw switch according to the present disclosure are described below with reference to FIGS. 1-19 herein. Like reference numerals used in the drawings identify similar or identical elements throughout the several views. The drawings are not necessarily drawn to scale.

With reference now to FIG. 1, a unidirectional DC solid-state switch circuit 100 including a solid-state aided airgap with a parallel multi-throw switch is illustrated in accordance with a non-limiting embodiment of the present disclosure. The unidirectional DC switch circuit 100 includes an isolation switch 110 and an interruption circuit 115 connected in series with the isolation switch 110. The isolation switch 110 is configured to selectively open or close an airgap between a voltage source (see FIG. 2) and the interruption circuit 115.

The interruption circuit 115 includes a parallel connection of a conducting branch 120, a bypass power electronics branch 122, a gate driving branch 124, and an energy absorbing branch 126. The conducting branch 120 includes a parallel multi-throw switch 125, e.g., connected in parallel with the bypass power electronics branch 122, a gate driving branch 124, and an energy absorbing branch 126. The multi-throw switch 125 is configured to operate in a first position to establish a first electrical connection between the current conducting branch 120 and a load 104 and a second position to establish a second electrical connection that interrupts the connection between the current conducting branch 120 and a load 104 and turns off the bypass power electronics branch 122. According to a non-limiting embodiment, the multi-throw switch 125 is a double-throw switch 125, which includes a first terminal (T1) connected to the isolation switch 110, a second terminal (T2) configured to establish electrical connection with the load 104, and a third terminal (T3) connected to the gate driving branch 124.

The bypass power electronics branch 122 includes a power electronics component (Q1) 127 connected in series with a voltage setting component (RVa) 128. The power electronics component 127 can be implemented using various solid-state semiconductor devices or transistors including, but not limited to, an insulated-gate bipolar transistor (IGBT) and a metal-oxide-semiconductor field-effect transistor (MOSFET).

The voltage setting component (RVa) 128 includes a first terminal connected to the power electronics component 127 (e.g., a collector terminal). A second terminal of the voltage setting component (RVa) 128 is connected in common with the gate driving branch 124, the current conducting branch 120 and the energy absorbing branch 126. The voltage setting component (RVa) 128 includes, but is not limited to, a transient voltage suppressor diode, a Zener diode, a resistor, and a varistor such as a metal oxide varistor (MOV). The voltage setting component (RVa) 128 is configured to clamp the voltage that is present across the bypass power electronics branch 122. The voltage setting component 128 can be selected with operating specifications that allow the power electronics component 127 to operate at a targeted voltage range which avoids overvoltage damage and/or thermal stress while still applying an amount of voltage that will turn on the power electronics component 127.

The gate driving branch 124 includes a series connection of a resistor (R1) 130, a diode (D1) 132, and a Zener diode (Z1) 134. The resistor (R1) 130 includes a first terminal connected in common with the first terminal of the voltage setting component (RVa) 128, the current conducting branch 120 and the energy absorbing branch 126. A second terminal of the resistor (R) 130 is connected to an anode of the diode (D1) 132.

The Zener diode (Z1) 134 includes a cathode connected in common with the multi-throw switch (e.g., the third terminal T3) and a cathode of the diode (D1). The anode of the Zener diode (Z1) 134 is connected in common with the power electronics component 127 (e.g., a emitter terminal) and the multi-throw switch (e.g., the second terminal T2). According to a non-limiting embodiment, a gate resistor 136 can be connected between the gate driving branch 124 and the power electronics component 127. For example, a first terminal of the gate resistor 136 can be connected to the first power electronics component 127 (e.g., a gate terminal) and a second terminal the gate resistor 136 can be connected in common with the cathode of the diode (D1) 132, the cathode of the Zener diode (Z1) 134, and the multi-throw switch 125 (e.g., the third terminal T3).

The energy absorbing branch 126 includes an energy absorbing device 160 having a first terminal connected in common with the isolation switch 110, the multi-throw switch 125 (e.g., the first terminal T1), the first terminal of the resistor 130 and the first terminal of the voltage setting component (RVa) 128. The second terminal of the energy absorbing branch 126 is connected in common with the multi-throw switch 125 (e.g., the second terminal T3), the anode of the Zener diode 134, and the power electronics component 127 (e.g., the emitter). The energy absorbing device 160 can be implemented using various components including, but not limited to, a transient voltage suppressor (TVS) diode, a metal oxide varistor (MOV), and a snubber circuit.

Figure 2:
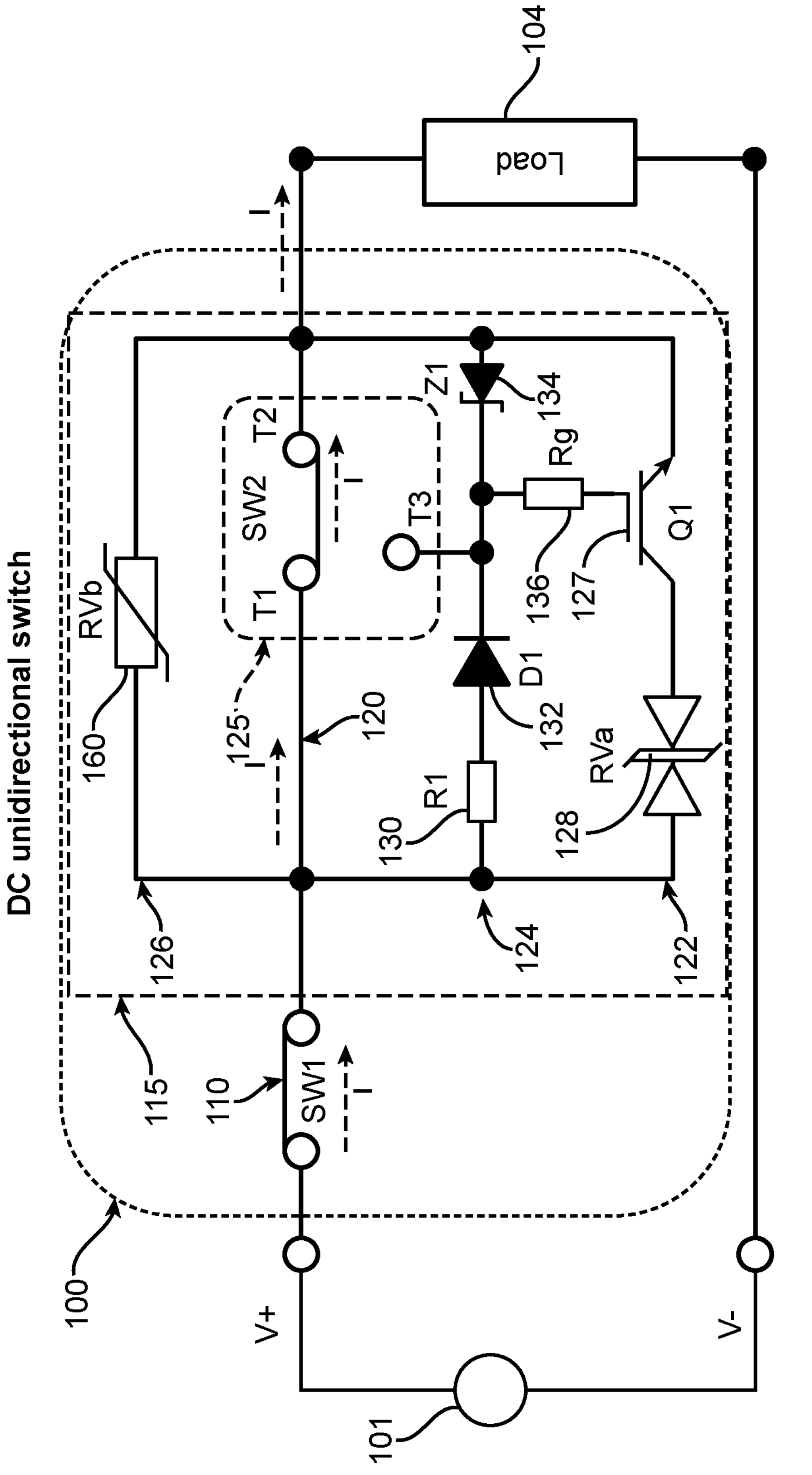
FIG. 2 illustrates the DC unidirectional switch circuit of FIG. 1 operating in a normal operating state to deliver electrical current to a load.

With reference now to FIGS. 2-6, operation of the unidirectional DC solid-state switch circuit 100 will be described according to one or more non-limiting embodiment of the present disclosure. In FIG. 2, the DC unidirectional circuit 100 is illustrated as being connected to a voltage source 101 and operating in a normal operating state. Accordingly, the conducting branch 120 delivers electrical current to a load 104 via the closed isolation switch 110 and the multi-throw switch 125 adjusted in its first position (e.g., connecting together terminal T1 and terminal T2).

Figure 3:
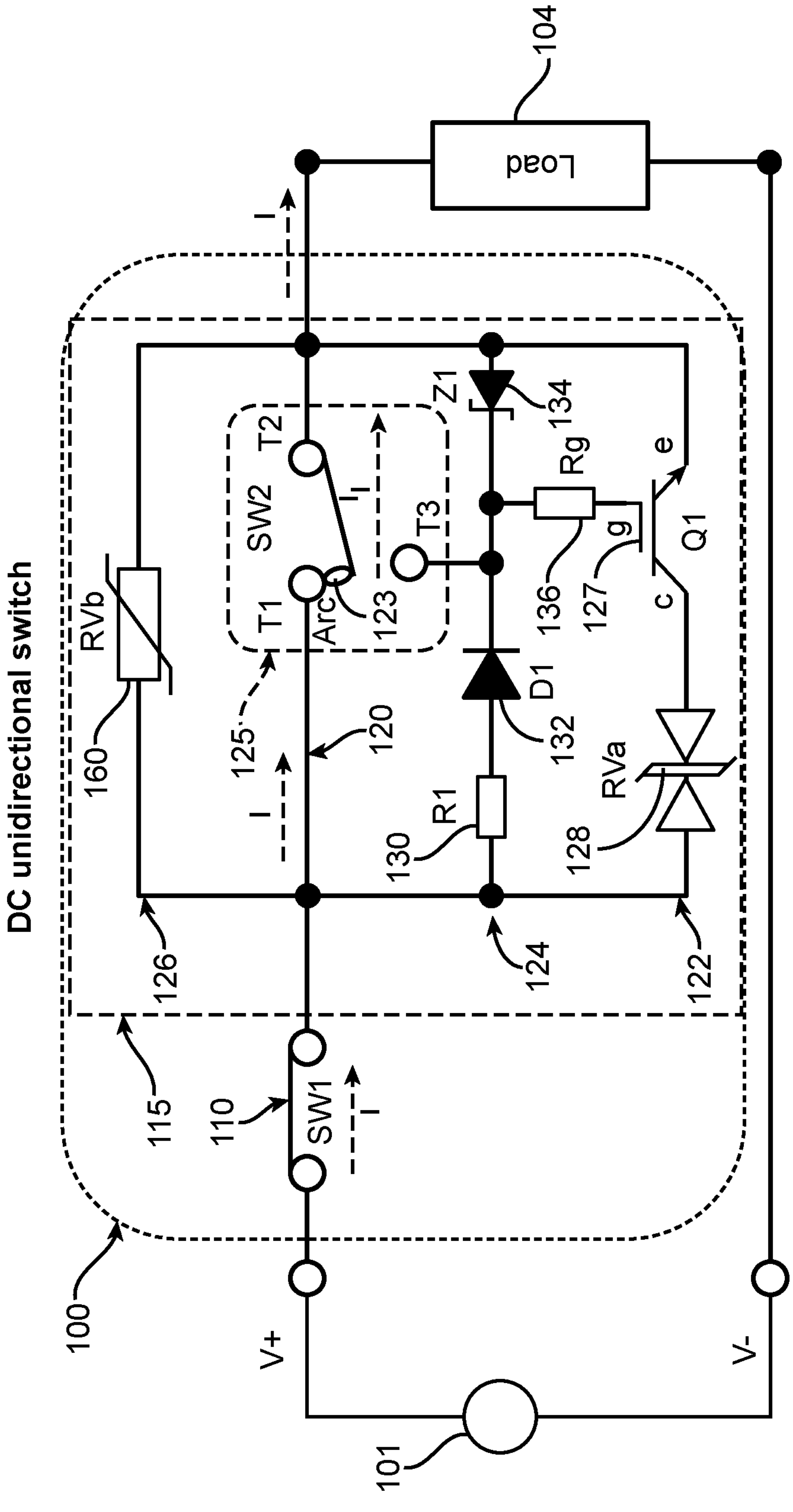
FIG. 3 illustrates the DC unidirectional switch circuit of FIG. 1 while operating in a state that adjusts the multi-throw switch to produce an arc that turns on a solid-state switching component.

Turning to FIG. 3, the DC unidirectional switch circuit 100 is illustrated after adjusting the multi-throw switch 125 from its first position (e.g., connecting terminals T1 and T2) into its second position (connecting terminals T2 and T3) to activate the interruption circuit 115. The initial adjustment of the multi-throw switch 125 produces an arc 123 (e.g., across T1 and the moving switch plate connected to T2), which has an arc voltage that continues conducting the electrical current through the conducting branch 120.

To extinguish the arc 123, the current is commuted to the bypass power electronics branch 122 which effectively establishes a bypass current path based on the operating state of the power electronics component (Q1) 127. For example, the power electronics component (Q1) 127 is in an OFF state when the threshold voltage Vge (e.g., the voltage across the gate (g) and emitter (e) is lower than the particular ON voltage threshold of the power electronics component (Q1) 127. Accordingly, when the arc 123 is not produced, there is no voltage applied to the gate (g) such that the power electronics component (Q1) 127 is turned off.

As described herein, the arc voltage produced when adjusting the multi-throw switch 125 into its second position is used to turn on the power electronics component (Q1) 127. For example, a voltage drop (e.g., 15V-20V) is produced when the multi-throw switch 125 is initially adjusted from its first position (e.g., moved from terminal T1). This voltage drop applies a voltage to the gate driving branch 124 and the gate (g) (e.g., via the gate resistor 136), which increases as the switch plate moves closer toward terminal T3 to establish the switch's second position. Once the arc voltage exceeds the voltage threshold (Vge), the power electronics component (Q1) 127 is turned on and the gate driving branch becomes conductive. As the arc 123 increases, the gate voltage (e.g., the voltage across the gate resistor 136) reaches a voltage level that turns on the Zener diode 134. When switched on, the Zener diode 134 maintains the voltage threshold (Vge) at a target level that avoids damaging the power electronics component (Q1) 127.

According to an embodiment of the present disclosure, although the arc 123 may establish a voltage across the gate and emitter, the current may not yet commute to the bypass power electronics branch 122 because the initial voltage level is below the threshold voltage (Vge) of the power electronics component (Q1) 127. That is, the bypass power electronics branch 122 can conduct current only after the arc voltage is larger than the voltage drop across the bypass power electronics branch 124 (e.g., the sum of the clamping voltage established by the voltage setting component (RVa) 128 and the voltage drop of the power electronics component (Q1) 127) after it receives the current).

Figure 4:
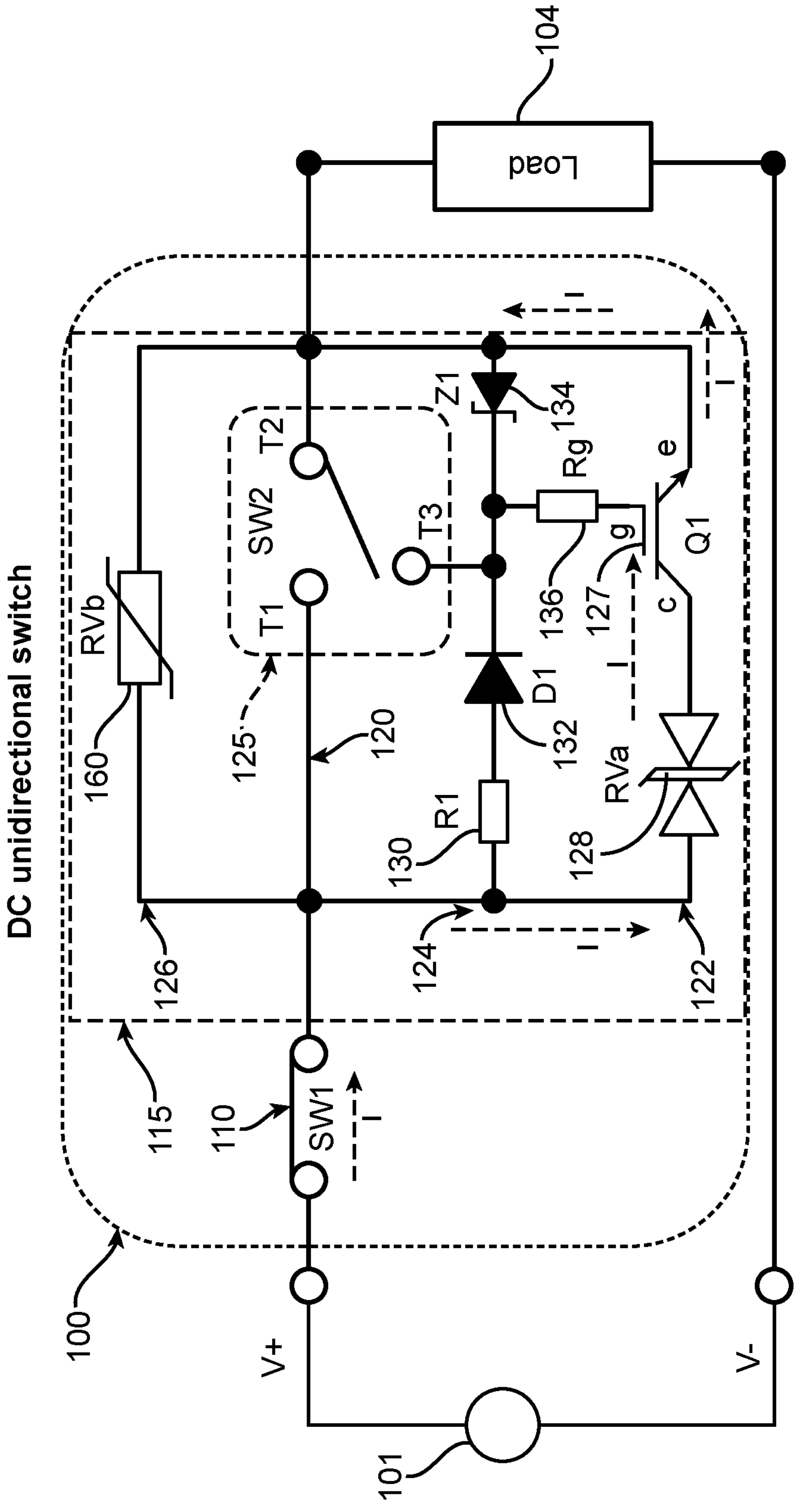

Turning to FIG. 4, the DC unidirectional switch circuit 100 is illustrated conducting current through a current bypass path established while the power electronics component (Q1) 127 is turn on. As described herein, the voltage setting component (RVa) 128 is configured to clamp the voltage that is present across the bypass power electronics branch 122. Accordingly, the clamped voltage drop across the bypass power electronics branch 122 maintains the gate voltage (e.g., the voltage across the gate resistor 136) at a voltage level above the voltage threshold (Vge) to keep the power electronics component (Q1) 127 turned on after the arc 123 is extinguished without damaging the power electronics component (Q1) 127. If, for example, the bypass power electronics branch 122 contained only the power electronics component (Q1) 127 and omitted the voltage setting component (RVa) 128, the gate voltage would drop to a low level would not conduct current or would conduct a very small amount of current. In addition, the power electronics component (Q1) 127 would experience high thermal stress, and would likely to fail.

Figure 5:
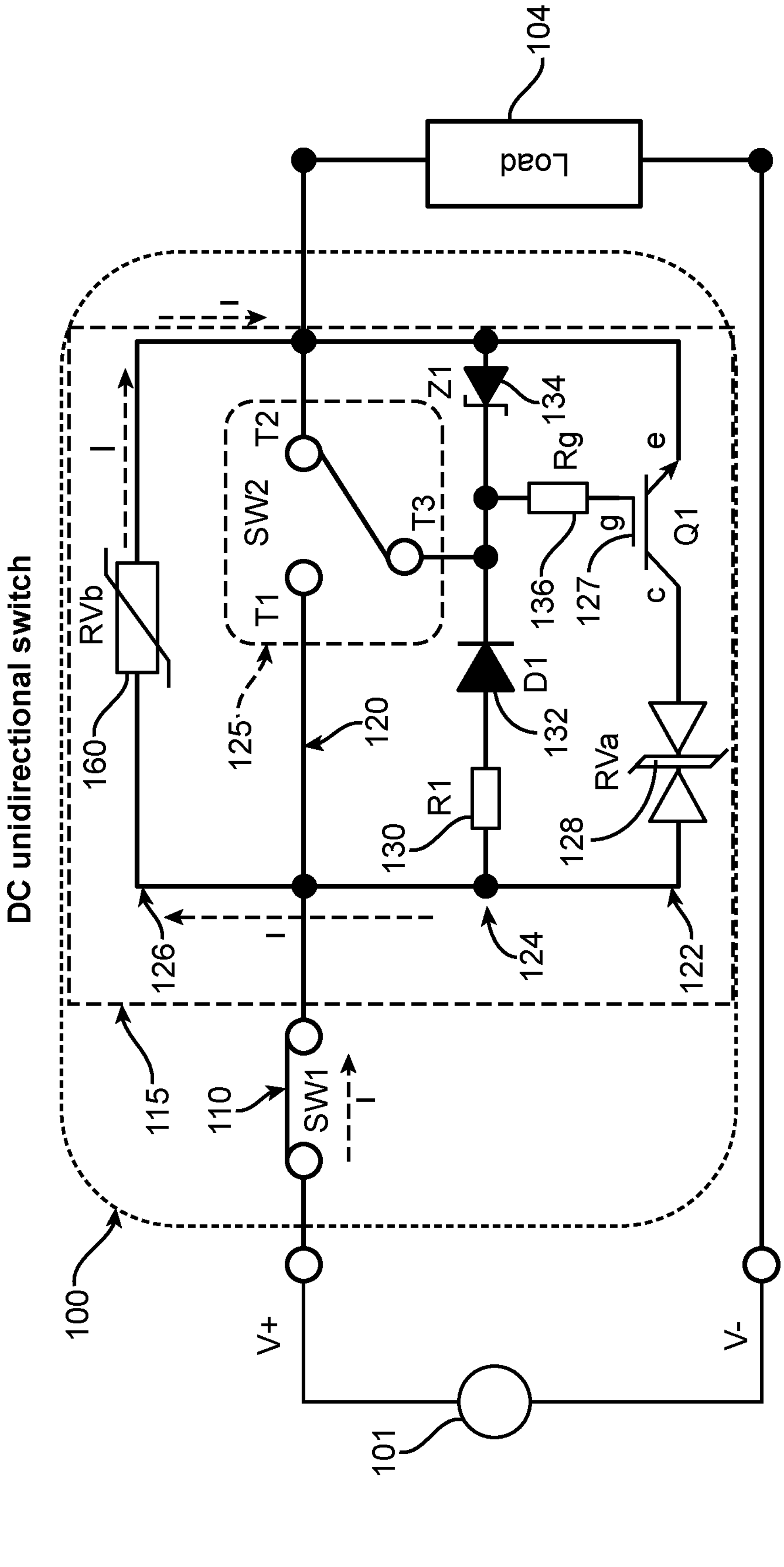
FIG. 5 illustrates the DC unidirectional switch circuit conducting current through an energy absorption path that is established after the multi-throw switch turns off the solid-state switching component.

Referring now to FIG. 5, the DC unidirectional switch circuit 100 is illustrated conducting current through the energy absorption branch 126 once the power electronics component (Q1) 127 is turned off. According to a non-limiting embodiment, the multi-throw switch 125 eventually reaches its second position and establishes electrical connection between the third terminal T3 and the second terminal T2 which short-circuits the gate of the power electronics component (Q1) 127. Accordingly, the threshold voltage (Vge) is set to 0V (or substantially 0V) which turns off the power electronics component (Q1) 127 and forces the current to the energy absorbing branch 126. The energy absorbing branch 126 delivers the current to the energy absorbing device 160 where the energy of the current is dissipated, and the current level is eventually reduced to zero amperes (0 A).

According to a non-limiting embodiment, the value of the gate resistor 136 can be selected to control the turn-off rate of the power electronics component (Q1) 127. For example, lowering value of the gate resistor 136 will reduce the time it takes for the power electronics component (Q1) 127 to shut off. As a trade-off, however, lowering the value of the gate resistor 136 but will produce a lower voltage drop and a higher voltage level applied to the gate of the power electronics component (Q1) 127. Accordingly, the value of the gate resistor 136 can be selected based on the voltage source and load requirements to be used with the unidirectional DC solid-state switch circuit 100.

Figure 6:
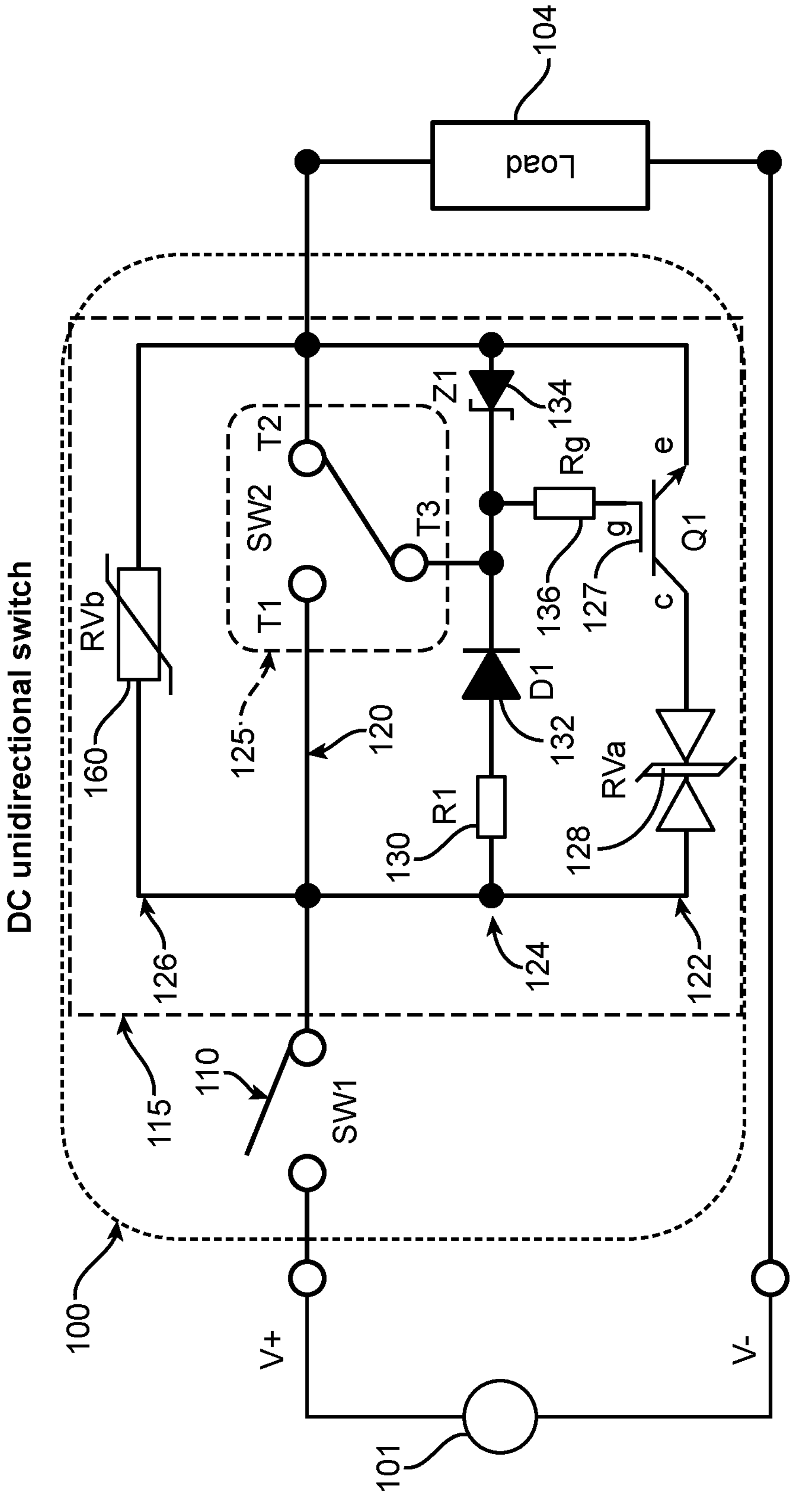
FIG. 6 illustrates the DC unidirectional switch circuit after opening an isolation switch to isolate to the interruption circuit and the load from the voltage source.

Turning to FIG. 6, the DC unidirectional switch circuit 100 is illustrated after opening the isolation switch 110. Accordingly, the interruption circuit 115 and the load 104 are electrically isolated from the voltage source 101. Depending on the application of the DC unidirectional switch circuit 100, the isolation switch 110 can be opened (e.g., manually) before, during or after performing the current interruption by the interruption circuit 115 described above.

Figure 7:
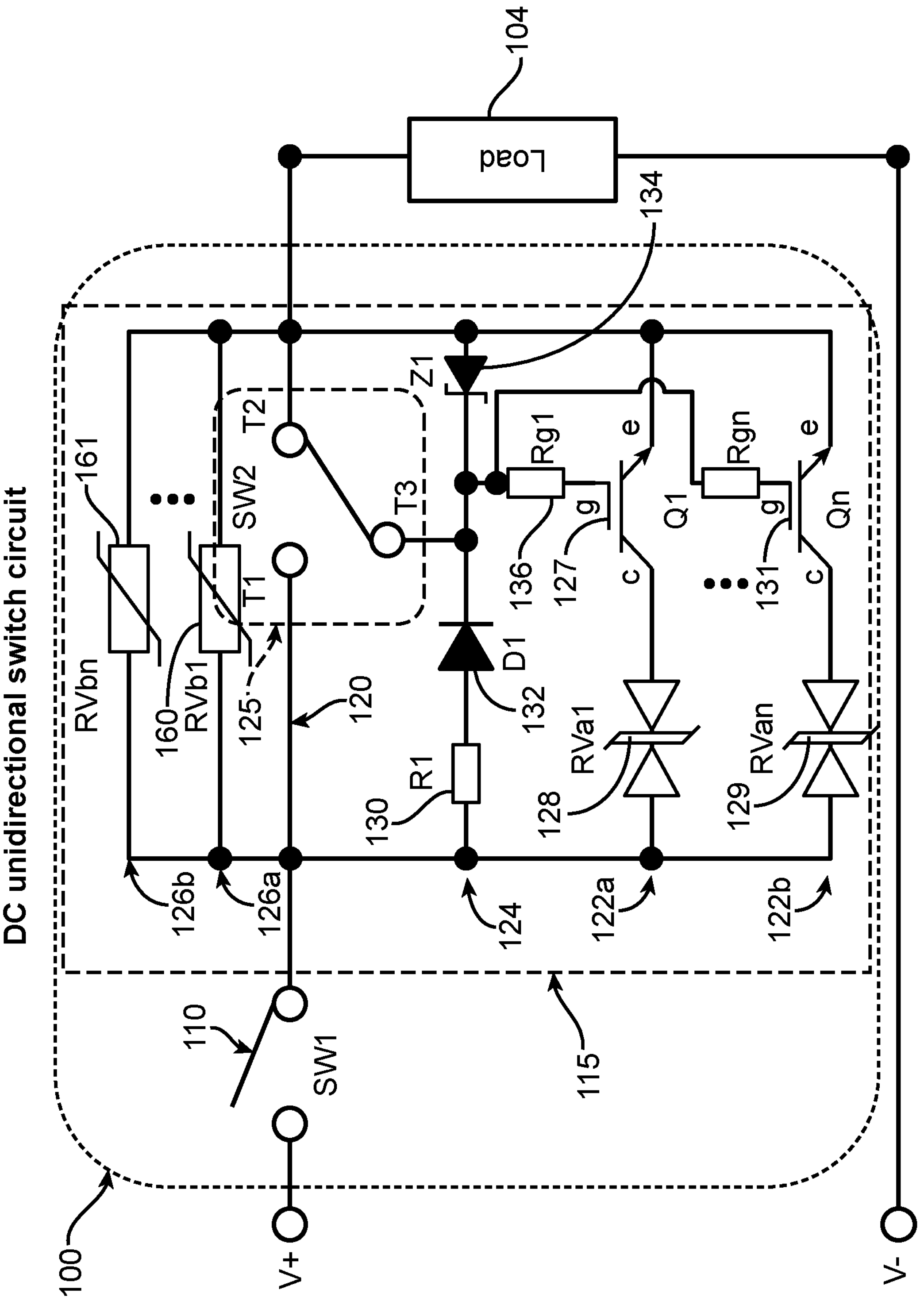
FIG. 7 illustrates a DC unidirectional switch circuit including an interruption circuit that implements solid-state aided airgap with a parallel multi-throw switch according to another non-limiting embodiment of the present disclosure.

FIG. 7 illustrates the DC unidirectional switch circuit 100 according to another non-limiting embodiment of the present disclosure. For example, the DC unidirectional switch circuit 100 can be scaled by adding additional bypass power electronics branches 122*a*-122*n* and/or additional energy absorbing branches 126*a*-126*n*. Accordingly, the DC unidirectional switch circuit 100 can be designed to handle higher current levels that may be required by different loads 104. Although the DC unidirectional switch circuit 100 illustrated in FIG. 7 is shown with two bypass power electronics branches 122*a*, 122*b* and two energy absorbing branches 126*a*, 126*b*, additional bypass power electronics branches and/or additional energy absorbing branches 126*a*, 126*b* can be implemented without departing from the scope of the invention.

Figure 8:
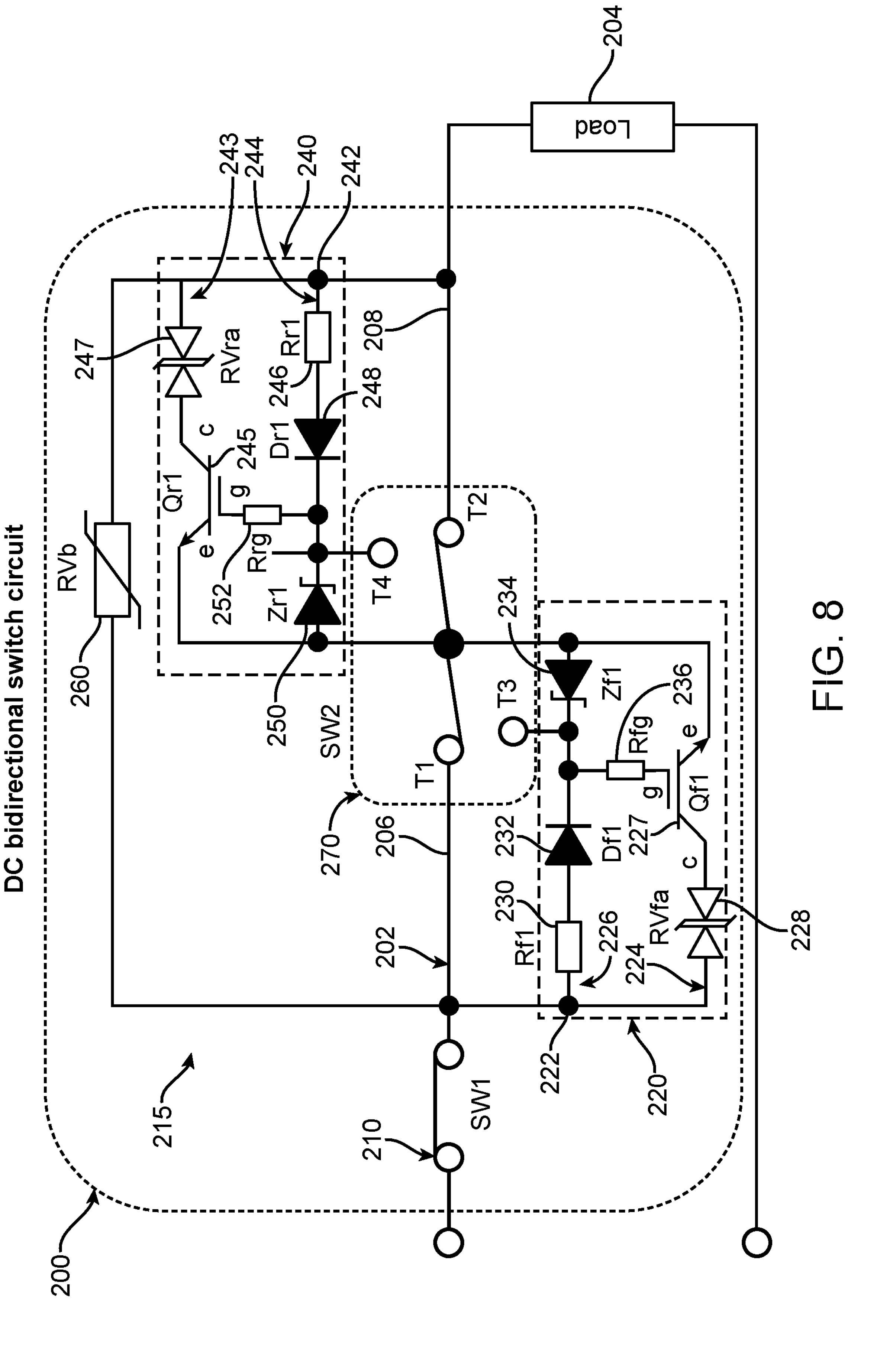
FIG. 8 illustrates a DC bidirectional switch circuit including an interruption circuit that implements a forward current interruption sub-circuit and a reverse current interruption sub-circuit which are activated using a multi-break switch according to another non-limiting embodiment of the present disclosure.

With reference now to FIG. 8, a DC bidirectional switch circuit 200 including an interruption circuit 215 is illustrated according to a non-limiting embodiment of the present disclosure. The DC bidirectional switch circuit 200 includes a main current path 202, an isolation switch 210, a forward current interruption sub-circuit 220, and a reverse current interruption sub-circuit 240. The main current path 202 includes a voltage source segment 206 for connection to a voltage source 201 (see FIG. 9) and a load segment 208 for connection to a load 204. The isolation switch 210 is connected in series with the voltage source segment 206 and is configured to selectively open or close an airgap between the voltage source 201 and the main current path 202.

The forward current interruption sub-circuit 220 is connected in common with the isolation switch 210 and the voltage source segment 206 via a forward current input 222. The forward current interruption sub-circuit 220 includes a forward bypass power electronics branch 224 and a forward gate driving branch 226 connected in parallel with the forward bypass power electronics branch 224. The forward bypass power electronics branch 224 includes a first power electronics component (Qf1) 227 connected in series with a first voltage setting component (RVfa) 228. According to various non-limiting embodiments, the first power electronics component 227 includes, but is not limited to, a IGBT and a MOSFET.

The first voltage setting component (RVfa) 228 includes a first terminal connected to the forward current input 222 and a second terminal connected to the first power electronics component 227 (e.g., a collector terminal). The first voltage setting component (RVfa) 228 is configured to clamp the voltage that is present across the forward bypass power electronics branch 224. The first voltage setting component (RVfa) 228 includes, but is not limited to, a transient voltage suppressor diode a Zener diode, resistor and varistor such as a metal oxide varistor (MOV).

The forward gate driving branch 226 includes a series connection of a first resistor (Rf1) 230, a first diode (Df1) 232, and a first Zener diode (Zf1) 234. The first resistor (Rf1) 230 includes a first terminal connected in common with the first terminal of the first voltage setting component (RVfa) 228 and the forward current input 222. A second terminal of the first resistor (Rf1) 230 is connected to an anode of the first diode (Df1) 232. The anode of the first diode (Df1) 232 is further connected to the first power electronics component 227 (e.g., a emitter terminal). According to a non-limiting embodiment, a first gate resistor 236 can be connected between the forward gate driving branch 226 and the first power electronics component 227. For example, the first terminal of the first gate resistor 236 can be connected to the first power electronics component 227 (e.g., a gate terminal) and the second terminal connected in common with the cathode of the first diode (Df1) 232 and the cathode of the first Zener diode (Zf1) 234.

The reverse current interruption sub-circuit 240 includes a reverse current input 242 connected in common with the load segment 208 and the load 204. The reverse current interruption sub-circuit 240 includes a reverse bypass power electronics branch 243 and a reverse gate driving branch 244 connected in parallel with the reverse bypass power electronics branch 243. The reverse bypass power electronics branch 243 includes a second power electronics component (Qr1) 245 connected in series with a second voltage setting component (RVra) 247. According to one or more non-limiting embodiments, the second power electronics component (Qr1) 245 includes, but is not limited to, a IGBT and a MOSFET.

The second voltage setting component (RVra) 247 includes a first terminal connected to the reverse current input 242 and a second terminal connected to the second power electronics component 245 (e.g., a collector terminal). The second voltage setting component (RVra) 247 is configured to clamp the voltage that is present across the reverse bypass power electronics branch 243. According to one or more non-limiting embodiments, the second voltage setting component (RVra) 247 includes, but is not limited to, a transient voltage suppressor diode a Zener diode, resistor and varistor such as a metal oxide varistor (MOV).

The reverse gate driving branch 244 includes a series connection of a second resistor (Rr1) 246, a second diode (Dr1) 248, and a second Zener diode (Zr1) 250. The second resistor (Rr1) 246 includes a first terminal connected in common with the first terminal of the second voltage setting component (RVra) 247 and the reverse current input 242. A second terminal of the second resistor (Rr1) 246 is connected to an anode of the second diode (Dr1) 248. The second Zener diode (Zr1) 250 includes a cathode connected to the cathode of the second diode (Dr1) 248. The anode of the second Zener diode (Zr1) 250 is connected to the second power electronics component 245 (e.g., a emitter terminal). According to a non-limiting embodiment, a second gate resistor 252 can be connected between the reverse gate driving branch 244 and the second power electronics component (Qr1) 243. For example, a first terminal of the second gate resistor 252 can be connected to the second power electronics component 245 (e.g., a gate terminal) and the second terminal can be connected in common with the cathode of the second diode (Dr1) 248 and the cathode of the second Zener diode (Zf1) 250.

The energy absorbing device 260 includes a first terminal connected in common with the isolation switch 210, the voltage source segment 206 and the forward current interruption sub-circuit 220. The second terminal of the energy absorbing device 260 is connected in common with the reverse current interruption sub-circuit 240, the load segment 208 and the load 204. As described herein, the energy absorbing device 260 is configured to absorb and dissipate energy of current delivered thereto. The energy absorbing device 260 can be implemented using various components including, but not limited to, a transient voltage suppressor (TVS) diode, a metal oxide varistor (MOV), and a snubber circuit.

The multi-break switch (SW2) 270 is adjustable between a first position and a second position. The first position connects together the voltage source segment 206 and the load segment 208 to establish the main current path 202. The second position connects together the forward current interruption sub-circuit 220 and the reverse current interruption sub-circuit 240 to establish a current bypass path that interrupts the main current path 202, and turns off one or both of the forward current interruption sub-circuit 220 and the reverse current interruption sub-circuit 240. According to a non-limiting embodiment, the multi-break switch 270 is a double-break switch that includes a first terminal (T1), a second terminal (T2), a third terminal (T3), and a further terminal (T4). The first terminal (T1) is connected to the voltage source segment 206. The second terminal (T2) is connected to the load segment 208. The third terminal (T3) is connected to the forward current interruption sub-circuit 220. The fourth terminal (T4) is connected to the reverse current interruption sub-circuit 240. When operating in the first position, the multi-break switch 270 connects together the first and second terminals T1 and T2 to conduct the load current through the main current path 202. When operating in the second position, the multi-break switch connects together the third and fourth terminals (T3 and T4) to conduct the load current through the current by-pass path and to the load segment 208.

Figure 9:
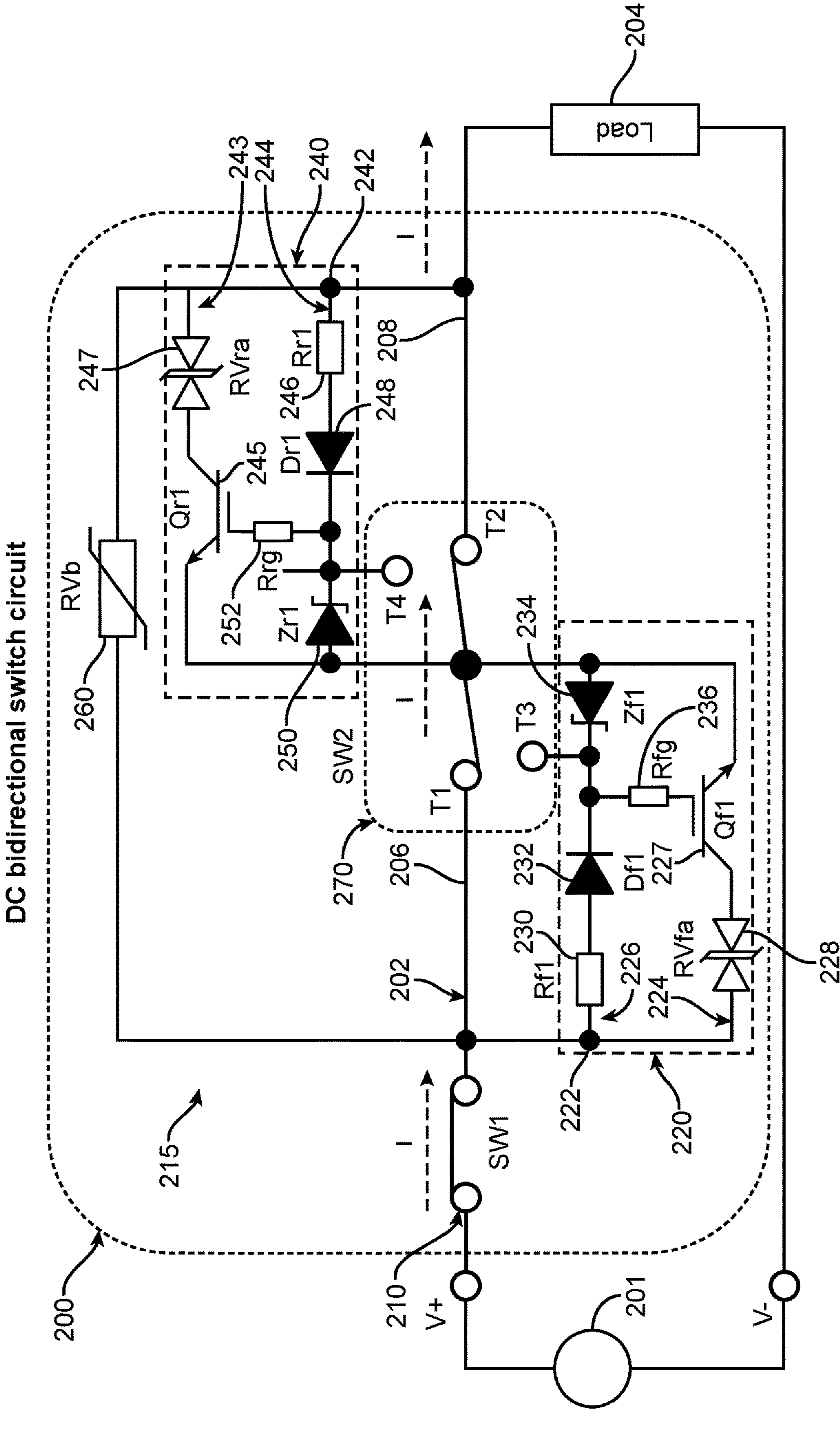
FIG. 9 illustrates the DC bidirectional switch circuit of FIG. 8 operating in a normal operating state to deliver electrical current in a forward direction to a load.

With reference now to FIGS. 9-18, operation of the DC bidirectional solid-state switch circuit 200 will be described according to one or more non-limiting embodiment of the present disclosure. FIG. 9 illustrates the DC bidirectional switch circuit 200 operating in a normal operating state. When in the normal operating state, the isolation switch 210 is closed and the multi-break switch 270 is in the first position to establish the main current path 202 and deliver electrical current in a forward direction to a load 204.

Figure 10:
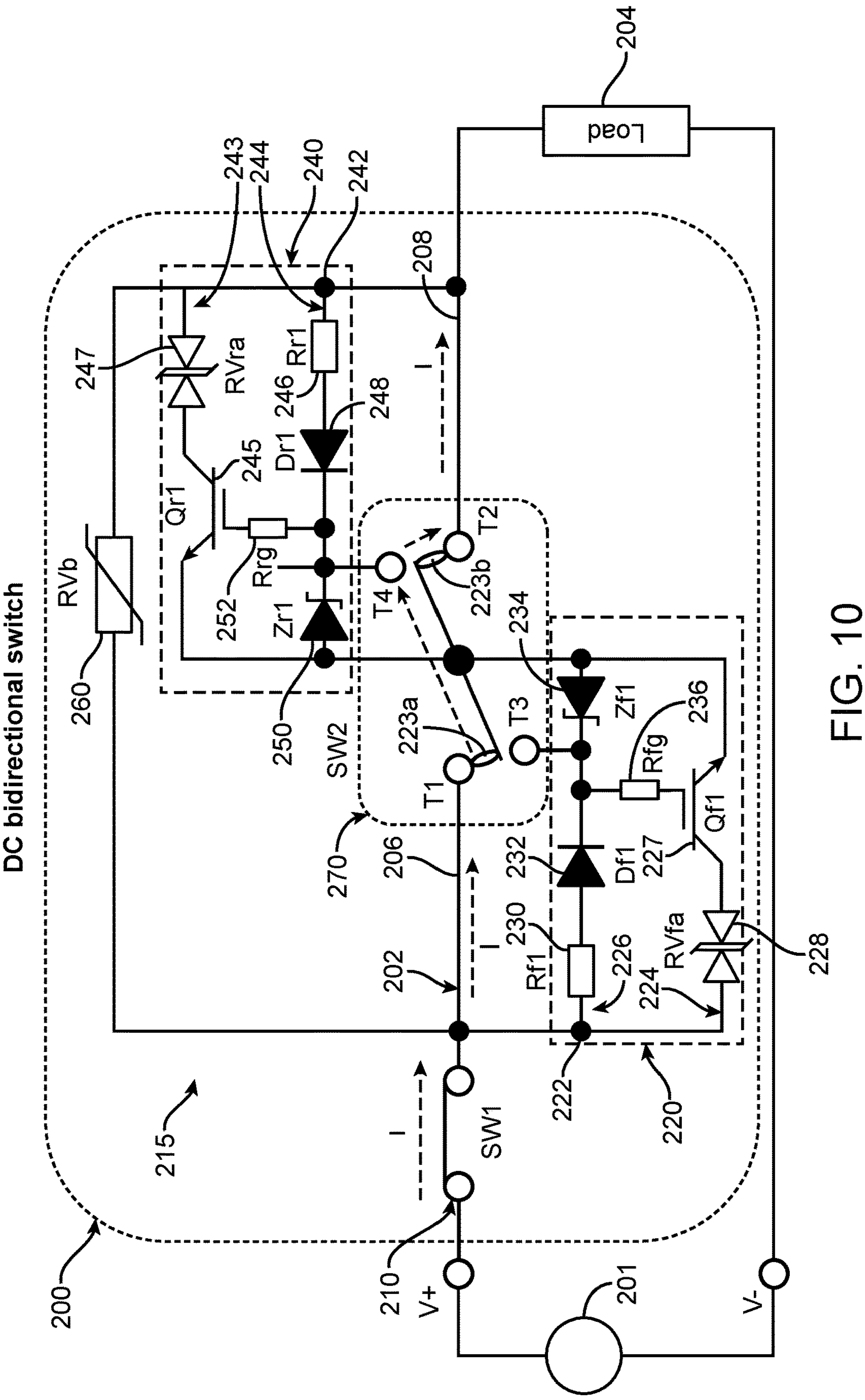
FIG. 10 illustrates the DC bidirectional switch circuit operating in a state that adjusts the multi-break switch to produce an arc that turns on a first solid-state switching component.
Figure 11:
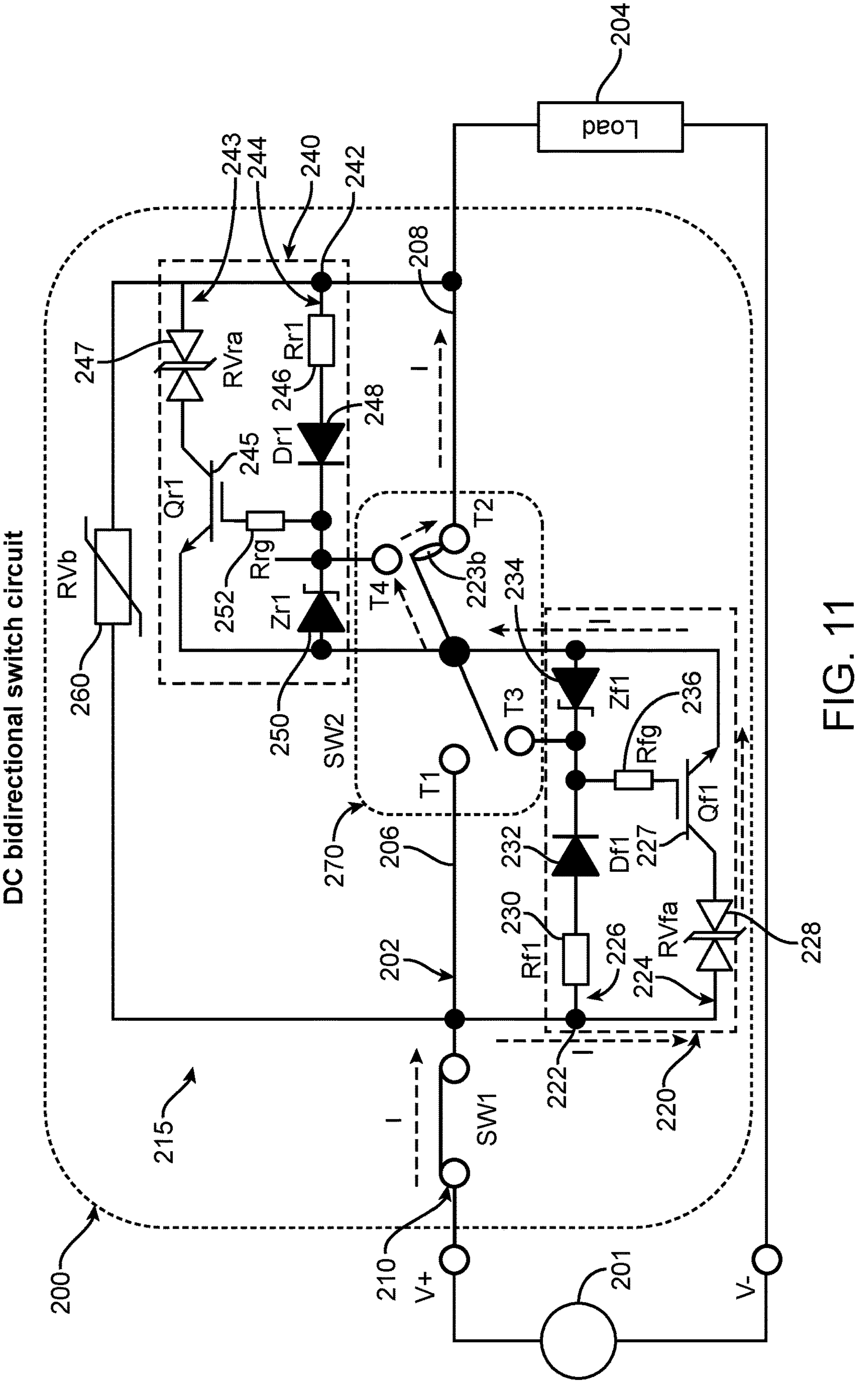

Turning to FIG. 10, the DC bidirectional switch circuit 200 is illustrated after adjusting the multi-break switch 270 from the first position to the second position to activate the interruption circuit 215. When initially adjusting the multi-break switch 270, a first arc 223*a* is drawn from the first terminal T1 and a second arc 223*b* is drawn from the second terminal T2. As described herein, the first arc 223*a* produces a positive voltage drop on the forward gate driving branch 226, while the second arc 223*b* produces a negative voltage drop on the reverse gate driving branch 244. The positive voltage drop turns on 2 as described herein. The negative voltage drop, however, applies a negative voltage on the gate of the second power electronics component 245, which keeps it turned off (e.g., non-conducting). Accordingly, current is conducted in the forward direction through a first current bypass path that is established while the first solid-state switching component is turned on as shown in FIG. 11.

Figure 12:
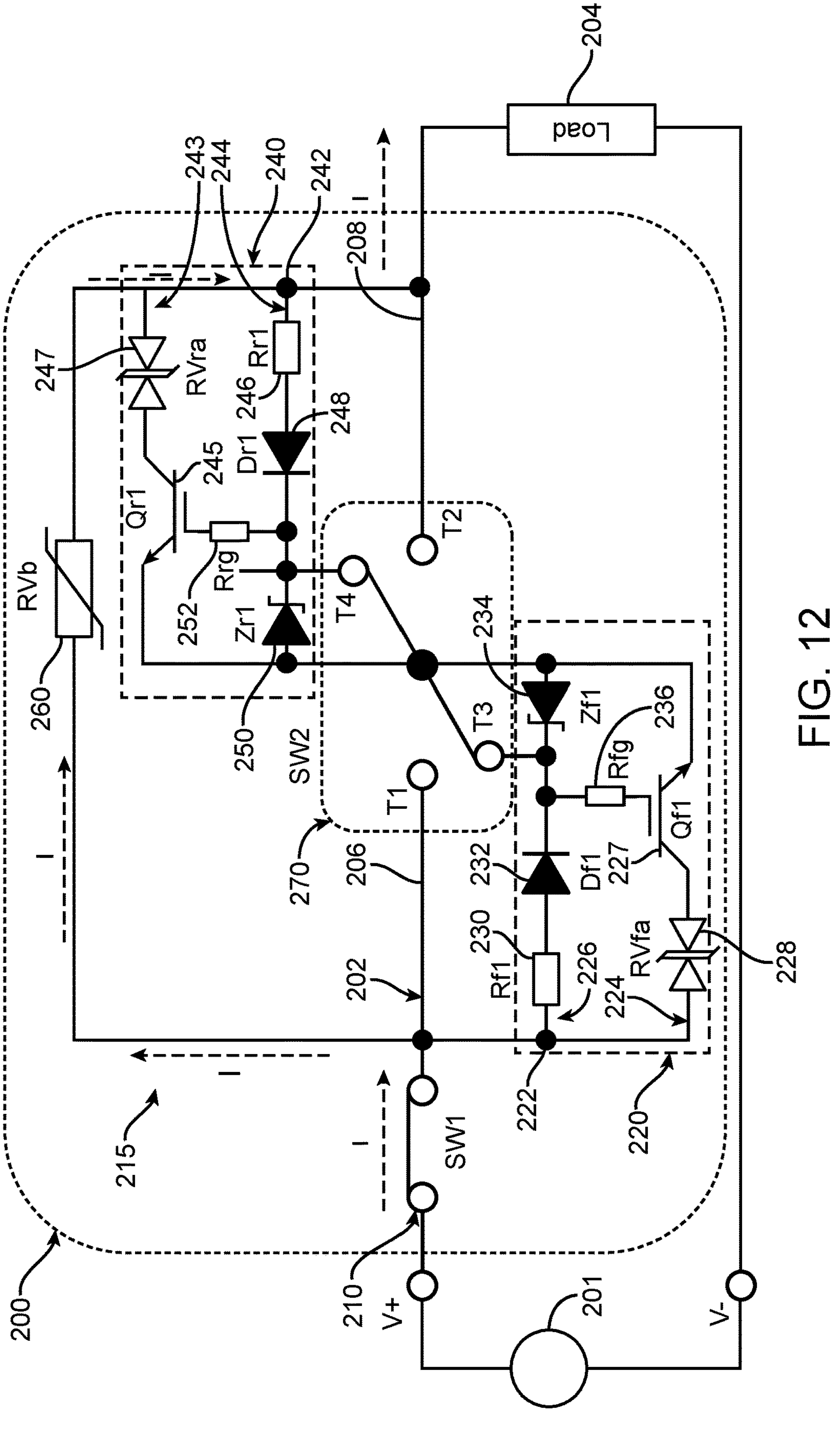
FIG. 12 illustrates the DC bidirectional switch circuit conducting current in the first direction through an energy absorption path that is established after the multi-break switch turns off the first solid-state switching component.

Referring to FIG. 12, the DC bidirectional switch circuit 200 is illustrated conducting the current in the forward direction along an energy absorption path. As described herein, the energy absorption path is established after the multi-break switch 270 reaches its second position and short-circuits the first power electronics component 227 thereby turning it off. Accordingly, the energy absorbing device 260 absorbs and dissipates the energy of the current until the current level is eventually reduced to 0 A.

Figure 13:
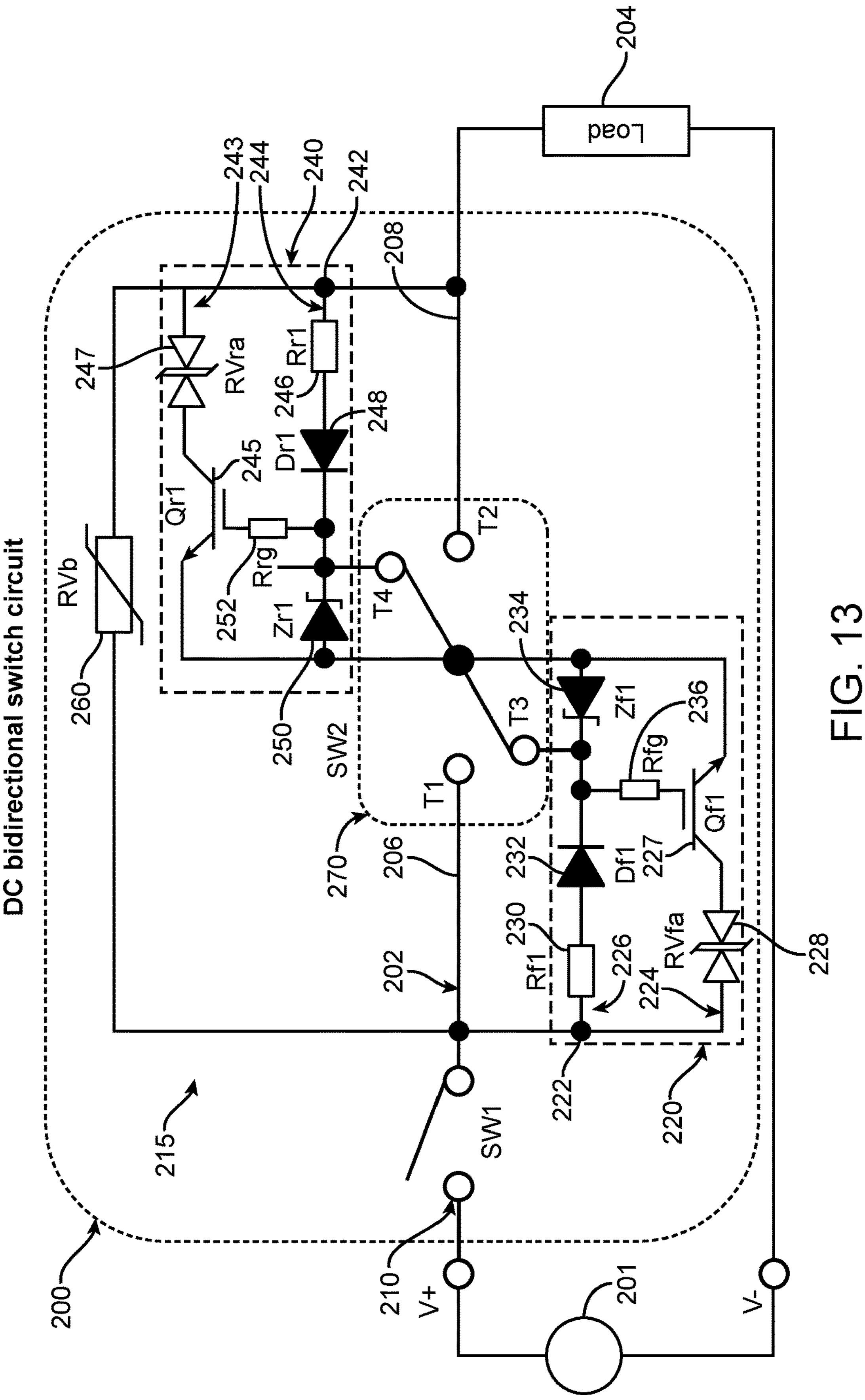
FIG. 13 illustrates the DC bidirectional switch circuit after opening an isolation switch to isolate the interruption circuit and the load from the voltage source.

In FIG. 13, the DC bidirectional switch circuit 200 is illustrated after opening the isolation switch 210. Accordingly, the interruption circuit 215 and the load 204 are electrically isolated from the voltage source 201. Depending on the application of the DC bidirectional switch circuit 200, the isolation switch 210 can be opened before, during or after performing the current interruption by the interruption circuit 215 described above.

Figure 14:
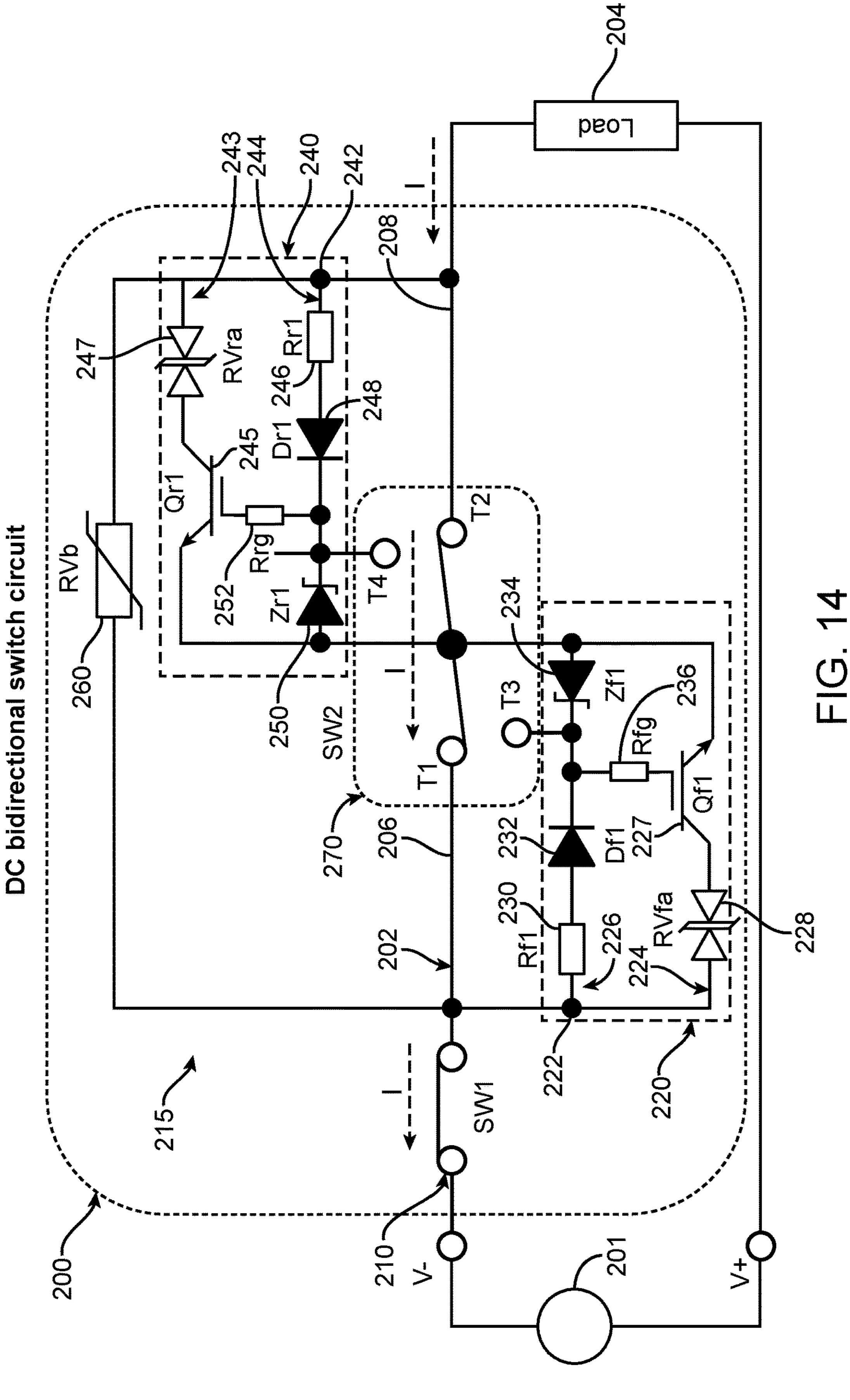
FIG. 14 illustrates the DC bidirectional switch circuit operating in a normal operating state to deliver electrical current in a reverse direction.

Turning to FIG. 14, the DC bidirectional switch circuit 200 is illustrated operating in a normal operating state to deliver electrical current in a reverse direction. The reverse current direction can occur, for example, when the DC bidirectional switch circuit 200 is connected in a reverse connection scenario (e.g., when the voltage source 201 is reversed connected to the DC bidirectional switch circuit 200).

Figure 15:
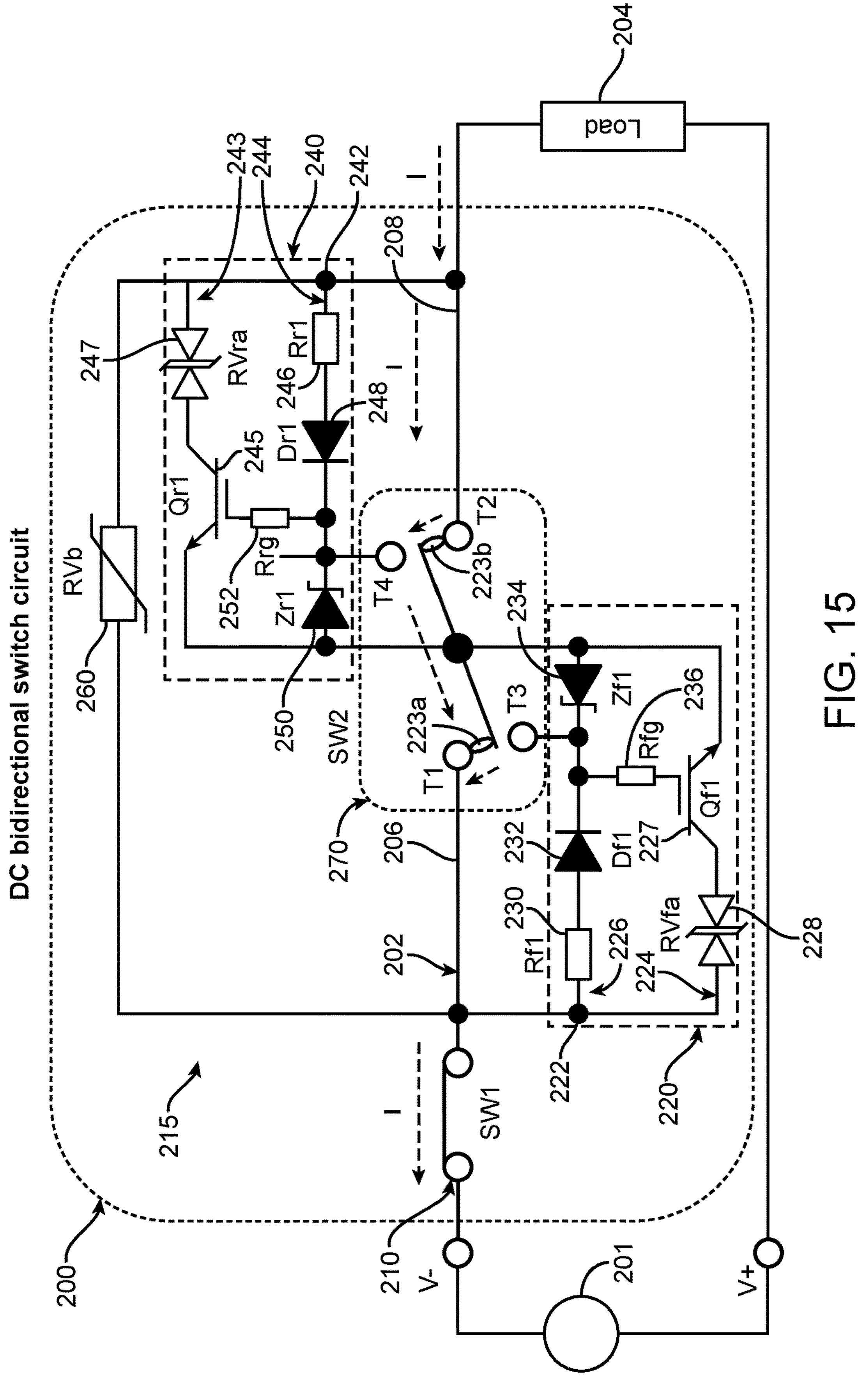
FIG. 15 illustrates the DC bidirectional switch circuit operating in a state that adjusts the multi-break switch to produce an arc that turns on a second solid-state switching component.
Figure 16:
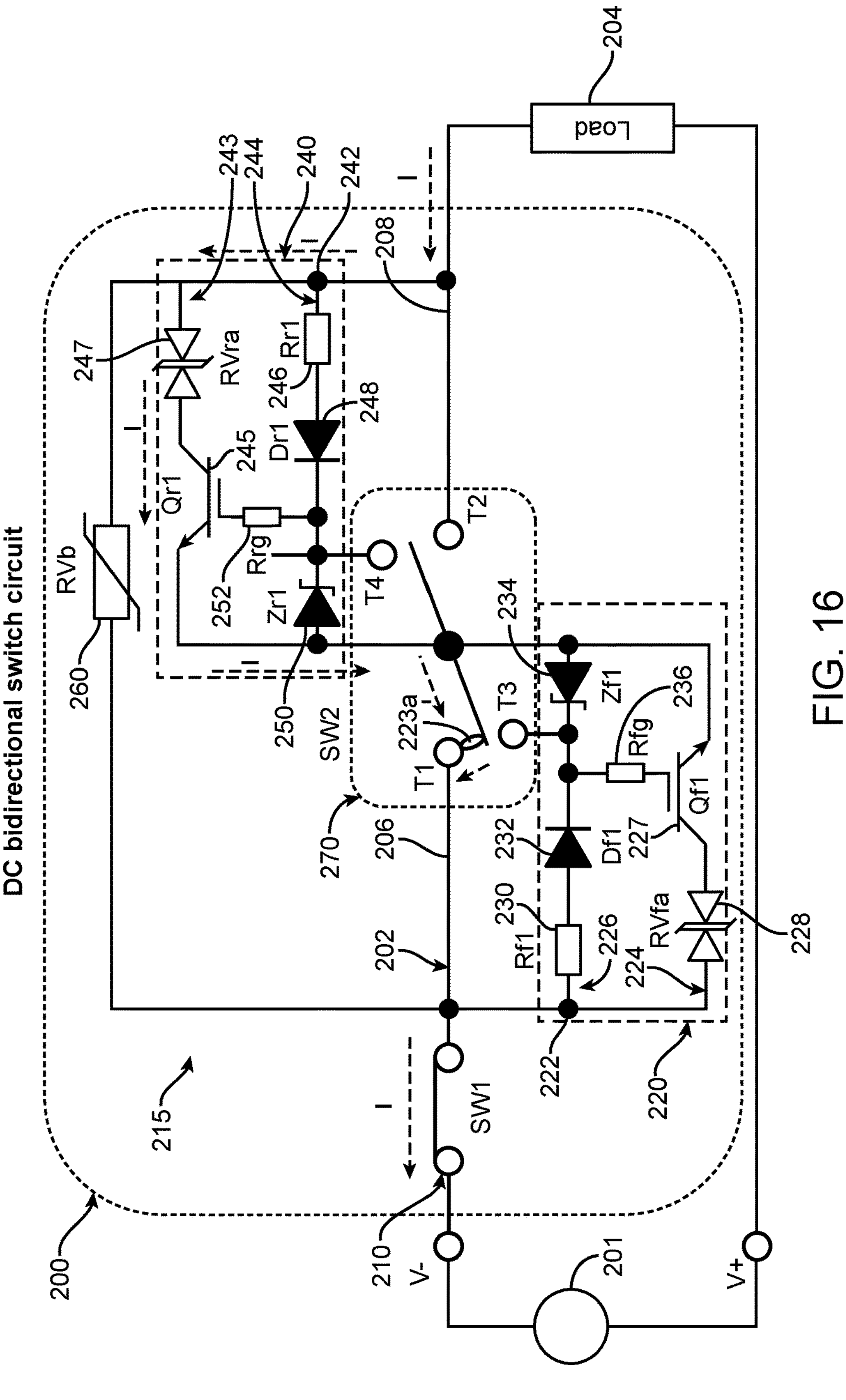

In FIG. 15, the multi-break switch 270 is adjusted from its second position to its first position while operating in the reverse connection scenario. Accordingly, the reverse gate driving branch 244 operates to turn ON the second power electronics component (Qr1) 245 based on the positive voltage applied by the arc 223*b* while the negative voltage applied to the forward gate driving branch 226 by arc 223*a* keeps the first power electronics component 227 (Qf1) OFF. Once the arc voltage of arc 223*b* exceeds the threshold voltage (Vge) of the second power electronics component (Qr1) 245, the current is delivered along a second bypass current path as shown in FIG. 16.

Figure 17:
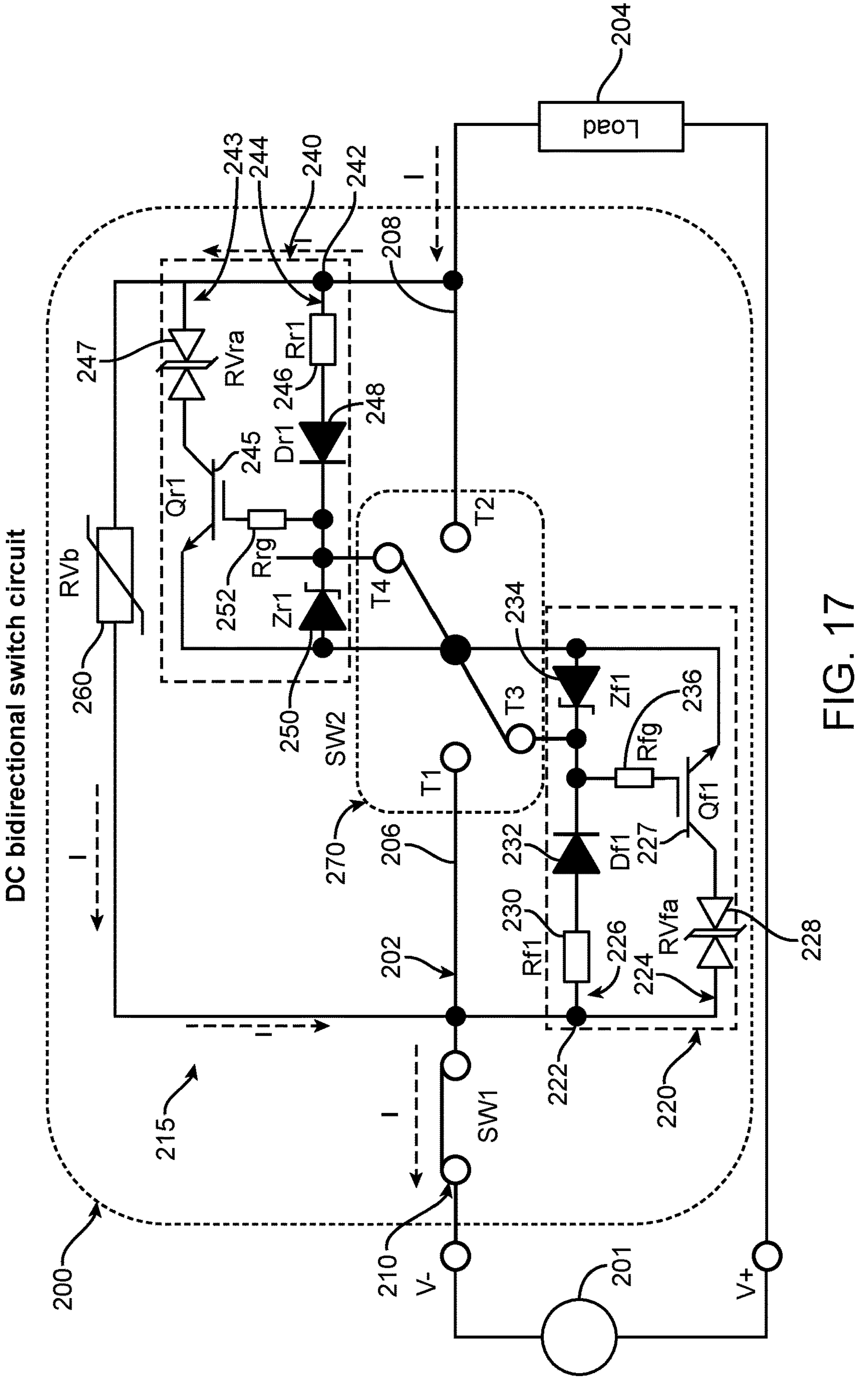
FIG. 17 illustrates the DC bidirectional switch circuit conducting current in the reverse direction through the energy absorption path that is established after the multi-break switch turns off the second solid-state switching component.

Turning to FIG. 17, the current is delivered in the reverse direction along the energy absorption path. In the reverse connection scenario, the energy absorption path is established after the multi-break switch 270 reaches its first position and short-circuits the second power electronics component 245 thereby turning it off. Accordingly, the energy absorbing device 260 absorbs and dissipates the energy of the current until the current level is eventually reduced to 0 A.

Figure 18:
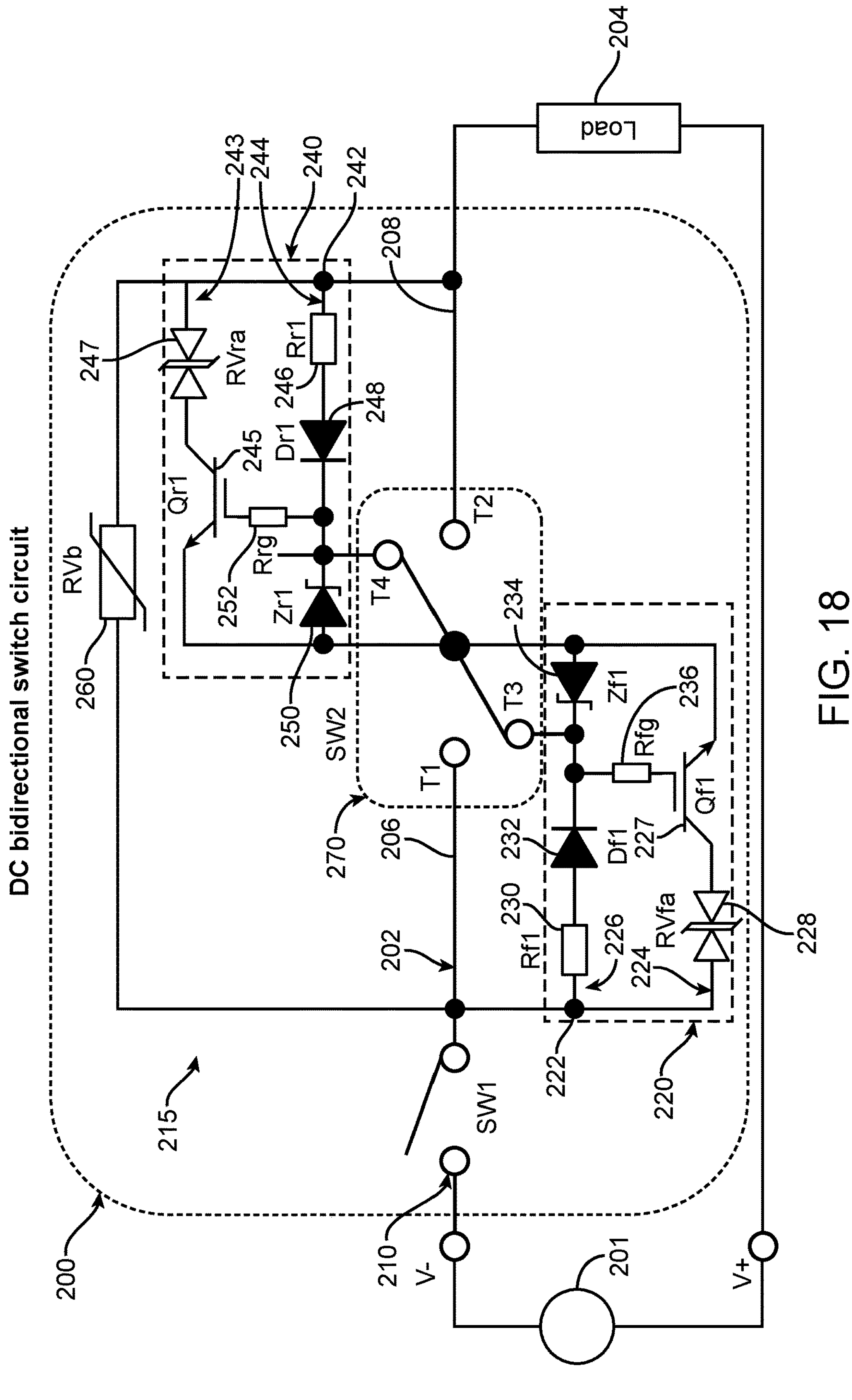
FIG. 18 illustrates the DC bidirectional switch circuit after opening the isolation switch to isolate the interruption circuit and the load from the voltage source.

Referring to FIG. 18, the DC bidirectional switch circuit 200 is illustrated after opening the isolation switch 210. Accordingly, the interruption circuit 215 and the load 204 are electrically isolated from the reverse connected voltage source 201. Depending on the application of the DC bidirectional switch circuit 200, the isolation switch 210 can be opened (e.g., manually) before, during or after performing the current interruption by the interruption circuit 215 described above.

Figure 19:
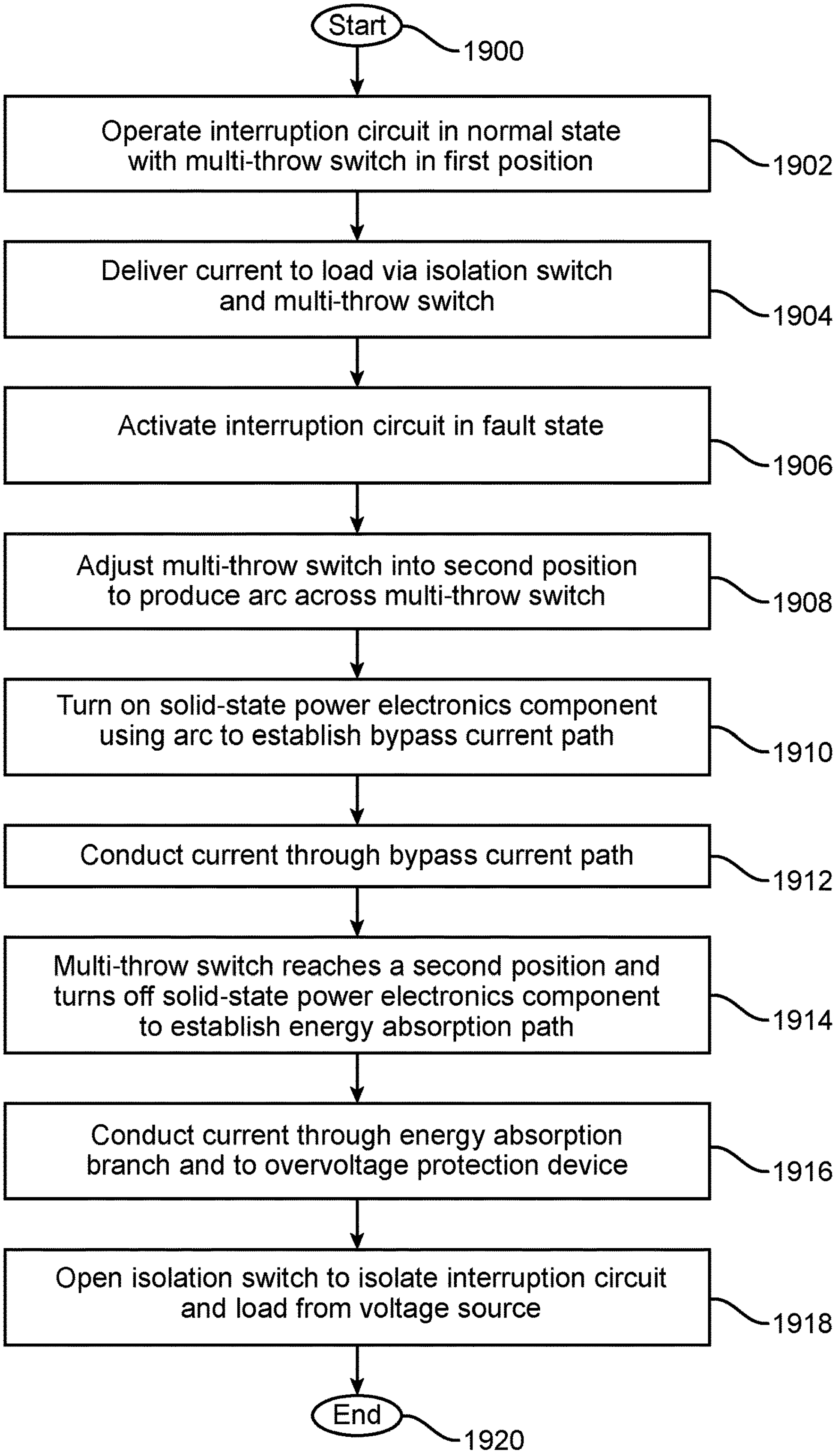
FIG. 19 illustrates a flow diagram illustrating a method of interrupting current delivered to a load connected to a DC solid-state switch circuit.

Turning now to FIG. 19, a flow diagram illustrates a method of interrupting current delivered to a load connected to a DC solid-state switch circuit 100 including solid-state aided airgap with parallel a multi-throw switch 125. The method begins at operation 1900, and at operation 1902 an interruption circuit 115 is operated in a normal state with the multi-throw switch 125 in a first position. At operation 1904, current is delivered to a load 104 via an isolation switch 110 operating in a closed position and the multi-throw switch 125 operating in the first position. At operation 1906, the multi-throw switch 125 is adjusted into a second position to produce an arc 123. At operation 1908, a solid-state power electronics component 127 is turned on using the arc 123 to establish a bypass current path 122 and the current is conducted through the bypass current path 122 at operation 1910. At operation 1912, the multi-throw switch 125 reaches a second position, which turns off the solid-state power electronics component 127 to establish an energy absorption path 126. At operation 1914, the current is conducted through the energy absorption path 126 and is delivered to an energy absorption device 160 where the energy is absorbed and dissipated. At operation 1916, an isolation switch 110 is opened to isolate the interruption circuit 115 and load 104 from voltage source 101, and the method ends at operation 1918.

As described herein, various non-limiting embodiments and techniques provide a DC switch circuit including a solid-state aided airgap with a parallel multi-throw switch. Non-limiting embodiments provide a unidirectional DC switch circuit to conduct current in a forward direction, and bidirectional DC switch circuit to conduct current in a forward or a reverse direction. One or more non-limiting embodiments of the DC switch circuit described herein can be used as a standalone disconnect switch or paired with a fuse as a fused disconnect switch, or as airgap for DC switch circuits.

While embodiments of the present disclosure have been disclosed in exemplary forms, it will be apparent to those skilled in the art that many modifications, additions, and deletions can be made therein without departing from the spirit and scope of the disclosure and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the disclosure has been described with reference to specific embodiments. However, one of ordinary skill in the art appreciates that various modifications and changes can be made without departing from the scope of the disclosure. Accordingly, the specification and figures are to be regarded in an illustrative rather than a restrictive sense, and all such modifications are intended to be included within the scope of disclosure.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A unidirectional direct current (DC) switch circuit comprising:

an isolation switch; and an interruption circuit connected in series with the isolation switch, the interruption circuit including a parallel connection of a current conducting branch, a bypass power electronics branch, a gate driving branch, and an energy absorbing branch, wherein the current conducting branch includes a multi-throw switch configured to operate in a first position to establish a first electrical connection between the current conducting branch and a load and a second position to establish a second electrical connection that turns off the bypass power electronics branch, wherein:

the bypass power electronics branch includes a power electronics component connected in series with a voltage setting component; and the gate driving branch includes a series connection of a resistor, a diode, and a Zener diode.

2. The unidirectional DC switch circuit of claim 1, wherein:

the resistor includes a first terminal connected in common with a first terminal of the voltage setting component, the current conducting branch and the energy absorbing branch, and a second terminal connected to an anode of the diode; and the Zener diode includes a cathode connected in common with the multi-throw switch and a cathode of the diode and includes an anode connected in common with the power electronics component and the multi-throw switch.

3. The unidirectional DC switch circuit of claim 2, wherein the voltage setting component includes a first terminal connected to the power electronics component and a second terminal connected in common with the gate driving branch, the current conducting branch, and the energy absorbing branch.

4. The unidirectional DC switch circuit of claim 3, wherein the energy absorbing branch includes an energy absorbing device having a first terminal connected in common with the isolation switch, the multi-throw switch, the first terminal of the resistor and the first terminal of the voltage setting component, and having a second terminal connected in common with the multi-throw switch, the anode of the Zener diode, and the power electronics component.

5. The unidirectional DC switch circuit of claim 4, wherein the multi-throw switch includes a first terminal connected to the isolation switch, a second terminal connected in common with the second terminal of the of the energy absorbing device and the anode of the Zener diode, and a third terminal connected in common with the cathode of the diode and the cathode of the Zener diode.

6. The unidirectional DC switch circuit of claim 1, wherein the power electronics component includes a transistor.

7. The unidirectional DC switch circuit of claim 1 wherein the voltage setting component includes one or a combination of a transient voltage suppressor diode, a Zener diode, a resistor and a varistor.

8. A bidirectional direct current (DC) switch circuit comprising:

a main current path configured to deliver a load current to a load, the main current path including a voltage source segment and a load segment, an isolation switch configured to selectively open or close an airgap between a voltage source and the voltage source segment, a forward current interruption sub-circuit including a forward current input connected in common with the isolation switch and the voltage source segment, a reverse current interruption sub-circuit including a reverse current input connected to the load segment, and a multi-break switch configured to operate in a first position that connects together the voltage source segment and the load segment to establish the main current path, and a second position to establish a connection that turns off one or both of the forward current interruption sub-circuit and the reverse current interruption sub-circuit, and further comprising an energy absorbing device including a first terminal connected in common with the isolation switch, the voltage source segment and the forward current interruption sub-circuit, and a second terminal connected in common with the reverse current interruption sub-circuit and the load segment, wherein:

the forward current interruption sub-circuit includes a forward bypass power electronics branch and a forward gate driving branch connected in parallel with the forward bypass power electronics branch, and the reverse current interruption sub-circuit includes a reverse bypass power electronics branch and a reverse gate driving branch connected in parallel with the reverse bypass power electronics branch, the forward bypass power electronics branch includes a first power electronics component connected in series with a first voltage setting component, and the reverse bypass power electronics branch includes a second power electronics component connected in series with a second voltage setting component.

9. The bidirectional DC switch circuit of claim 8, wherein:

the first voltage setting component includes a first terminal connected to the forward current input and a second terminal connected to the first power electronics component; and the second voltage setting component includes a first terminal connected to the reverse current input and a second terminal connected to the second power electronics component.

10. The bidirectional DC switch circuit of claim 9, wherein:

the forward gate driving branch includes a series connection of a first resistor, a first diode, and a first Zener diode; and the reverse gate driving branch includes a series connection of a second resistor, a second diode, and a second Zener diode.

11. The bidirectional DC switch circuit of claim 10, wherein the multi-break switch comprises:

a first terminal connected to the voltage source segment;

a second terminal connected to the load segment;

a third terminal connected to the forward gate driving branch; and a fourth terminal connected to the reverse the reverse gate driving branch.

12. The bidirectional DC switch circuit of claim 11, wherein the multi-break switch selectively operates in the first position that connects together the first and second terminals to establish the main current path, and the second position that connects together the third and fourth terminals to connect together the forward current interruption sub-circuit and the reverse current interruption sub-circuit.

* * * * *